(12) United States Patent
Subramani et al.

(10) Patent No.: US 9,749,408 B2
(45) Date of Patent: Aug. 29, 2017

(54) TECHNIQUES FOR MANAGING UNSYNCHRONIZED CONTENT ITEMS AT UNLINKED DEVICES

(71) Applicant: Dropbox, Inc., San Francisco, CA (US)

(72) Inventors: Anand Subramani, San Francisco, CA (US); Francois Alexander Allain, San Francisco, CA (US); Emil Ibrishimov, Redwood City, CA (US); Anton Anastasov, Cambridge, MA (US)

(73) Assignee: DROPBOX, INC., San Francisco, CA (US)

( * ) Notice: Subject to any disclaimer, the term of this patent is extended or adjusted under 35 U.S.C. 154(b) by 200 days.

(21) Appl. No.: 14/103,065

(22) Filed: Dec. 11, 2013

(65) Prior Publication Data

US 2015/0039738 A1   Feb. 5, 2015

Related U.S. Application Data

(60) Provisional application No. 61/860,161, filed on Jul. 30, 2013.

(51) Int. Cl.
*G06F 15/173* (2006.01)
*H04L 29/08* (2006.01)
(Continued)

(52) U.S. Cl.
CPC ...... *H04L 67/1095* (2013.01); *G06F 21/6218* (2013.01); *G06F 21/88* (2013.01);
(Continued)

(58) Field of Classification Search
CPC ..... H04L 67/1095; G06F 21/88; G06F 21/55; G06F 21/62
(Continued)

(56) References Cited

U.S. PATENT DOCUMENTS 6,581,074 B1 * 6/2003 Wong ................. G06F 17/3033
7,308,642 B2   12/2007 Rapakko et al.
(Continued)

FOREIGN PATENT DOCUMENTS

| JP | 2005535969 A | 11/2005 |
| JP | 2008005498 A | 1/2008 |
| WO | WO 2004/015576 A1 | 2/2004 |

OTHER PUBLICATIONS

International Searching Authority, "Search Report" in application No. PCT/US2014/044796, dated Nov. 12, 2014, 9 pages.
(Continued)

*Primary Examiner* — James Conaway
(74) *Attorney, Agent, or Firm* — Hickman Palermo Becker Bingham LLP

(57) ABSTRACT

Techniques are described herein for managing unsynchronized content items when the personal computing devices storing the unsynchronized content items are unlinked from a content item synchronization service. The techniques involve treating synchronized content items differently from unsynchronized content items. For example, after a personal computing is unlinked from the service, synchronized content items may be removed or deleted from the personal computing device and unsynchronized content items encrypted and/or moved to another data storage location.

22 Claims, 9 Drawing Sheets

(51) Int. Cl.
*G06F 21/88* (2013.01)
*G06F 21/55* (2013.01)
*G06F 21/62* (2013.01)
*H04L 29/06* (2006.01)

(52) U.S. Cl.
CPC .............. *G06F 21/55* (2013.01); *G06F 21/62* (2013.01); *G06F 2221/2107* (2013.01); *G06F 2221/2143* (2013.01); *H04L 63/0428* (2013.01)

(58) Field of Classification Search
USPC .......................................................... 709/223
See application file for complete search history.

(56) References Cited

U.S. PATENT DOCUMENTS

| | | | |
|---|---|---|---|
| 8,255,545 B1 | 8/2012 | Schmidt et al. | |
| 8,392,543 B1 | 3/2013 | Singh et al. | |
| 9,276,980 B2* | 3/2016 | Chan | G06F 17/30085 |
| 9,282,169 B1* | 3/2016 | Chang | H04L 67/42 |
| 2002/0171546 A1* | 11/2002 | Evans | G06F 21/554 |
| | | | 340/540 |
| 2004/0103174 A1* | 5/2004 | Balducci | G06Q 30/06 |
| | | | 709/221 |
| 2004/0117310 A1* | 6/2004 | Mendez | G06F 21/62 |
| | | | 705/50 |
| 2005/0171938 A1 | 8/2005 | Fisher et al. | |
| 2006/0212465 A1* | 9/2006 | Fish | G06F 11/1662 |
| 2006/0259521 A1* | 11/2006 | Armenta | G06F 17/30194 |
| 2007/0294529 A1* | 12/2007 | Blair | G06F 21/6218 |
| | | | 713/160 |
| 2008/0178300 A1* | 7/2008 | Brown | G06F 21/6218 |
| | | | 726/29 |
| 2011/0072520 A1* | 3/2011 | Bhansali | G06F 21/88 |
| | | | 726/27 |
| 2011/0184998 A1* | 7/2011 | Palahnuk | G06F 11/1464 |
| | | | 707/827 |
| 2011/0276683 A1* | 11/2011 | Goldschlag | H04W 4/00 |
| | | | 709/224 |
| 2012/0191651 A1* | 7/2012 | Irizarry, Jr. | H04L 67/1095 |
| | | | 707/634 |
| 2012/0210126 A1* | 8/2012 | Johnson | G06F 17/30 |
| | | | 713/165 |
| 2013/0138608 A1* | 5/2013 | Smith | G06F 17/30575 |
| | | | 707/610 |
| 2013/0318589 A1* | 11/2013 | Ford | H04L 63/08 |
| | | | 726/7 |
| 2014/0136662 A1* | 5/2014 | Chan | G06F 17/30085 |
| | | | 709/219 |

OTHER PUBLICATIONS

Claims in application No. PCT/US2014/044796, dated Nov. 2014, 6 pages.
Office Action in application No. 2016-531617, dated Apr. 21, 2017, 3 pages.
Current Claims in application No. 2016-531617 dated Apr. 2017, 4 pages.

* cited by examiner

| Name | Country | Latest activity | | |
|---|---|---|---|---|
|  mbpr579 | United States | 5 minutes ago | Rename | Unlink |
|  Android | N/A | Delete in progress | | Dismiss |

FIG. 6

| Name | Country | Latest activity | | |
|---|---|---|---|---|
|  mbpr579 | United States | 5 minutes ago | Rename | Unlink |
|  Android | N/A | Delete in progress | | Dismiss |
|  mbpr579 | United States | Delete successful | | Dismiss |

TECHNIQUES FOR MANAGING UNSYNCHRONIZED CONTENT ITEMS AT UNLINKED DEVICES

CROSS-REFERENCE TO RELATED APPLICATIONS; BENEFIT CLAIM

This application claims the benefit of U.S. Provisional Application No. 61/860,161, filed Jul. 30, 2013, the entire contents of which is hereby incorporated by reference as if fully set forth herein, under 35 U.S.C. §119(e).

TECHNICAL FIELD

The present invention relates to services that synchronize content items between network-connected computing devices.

BACKGROUND

Synchronization services exist today that allows users to synchronize content items stored on their personal computing devices with content items stored on computing systems managed by the services. An example of such a synchronization service is the Dropbox service provided Dropbox, Inc. of San Francisco, Calif.

Typically, synchronization services implement an asynchronous, eventually consistent, or optimistic data replication scheme that allows users to make changes to content items stored at their personal computing device without having to immediately synchronize the changes with the services. For example, this allows a user to make changes to locally stored content items in an offline environment without network connectivity to the service. Because of this at any given time there may be content items stored on the users' personal computing devices that are not synchronized with content items stored on the synchronization service's computers.

Generally, an unsynchronized content item is a new content item or a new version of a content item stored at a user's personal computing device that the synchronization service has not yet stored a copy of. This could be because the new content item or the change resulting in the new version has not yet been communicated to the service or the service has not yet completed storing a copy of the new content item on its systems or not yet completed application of the change to the existing copy of the content item stored on its systems. In contrast, a synchronized content item is a content item stored at a user's personal computing device for which the service has a copy of. Because of the data replication schemes used by many synchronization services, there may be at any time a mix of synchronized and unsynchronized content items stored at a user's personal computing device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are described herein for managing unsynchronized content items when the personal computing devices storing the unsynchronized content items are unlinked from a synchronization service. The techniques involve treating synchronized content items differently from unsynchronized content items. For example, after a user's personal computing device is unlinked from the service, synchronized content items stored at the user's personal computing device may be removed or deleted from the user's personal computing device and unsynchronized content items stored at the user's personal computing device may be encrypted and/or moved to another data storage location.

As used herein, the terms "unlink" or "unlinked", when used in the context of unlinking a personal computing device from a synchronization service or in the context of a personal computing device that is unlinked from a synchronization service, respectively, means that the synchronization service no longer synchronizes content items stored on computers managed by the synchronization service and associated with an account or a set of accounts maintained by the synchronization service with content items stored at the personal computing device. The personal computing device and the synchronization may again synchronize content items if the personal computing device is later re-linked with the account or set of accounts maintained by the synchronization service. The synchronization service may provide a user interface for unlinking devices linked to an account or set of accounts maintained by the synchronization service.

Treating unsynchronized content items differently from synchronized content items can be useful in situations where a person other than the user of the personal computing device has responsibility for administering content items stored at the user's device. For example, the user can be a member of a team within a company where another member of the team (a team administrator) has responsibility for administering the company's content items stored at team members' personal devices. If a team member's device is lost or stolen or the team member is removed from the team, then the company may desire to have all synchronized content items deleted or removed from the team member's device. For example, synchronized content items stored at the team member's device may contain sensitive corporate information. However, also removing or deleting the unsynchronized content items may destroy the only copy of those content items. This can be problematic. For example, this could prevent recovery of the unsynchronized content items in the event the team member rejoins the team. Thus, the company may not wish to have the unsynchronized content items removed or deleted like the synchronized content items. At the same time, the unsynchronized content items may also contain sensitive corporate information.

In accordance with one technique of the present invention, when a personal computing device storing unsynchronized and synchronized content items is unlinked from the synchronization service, the synchronized content items are removed or deleted from the personal computing device and the unsynchronized content items are not deleted or removed from the personal computing device. This technique preserves the potentially only copy of the unsynchronized content items in case they are needed after the device is unlinked.

In accordance with another technique of the present invention, the synchronized content items are removed or deleted from the personal computing device and the unsynchronized content items are not deleted or removed from the personal computing device as with the previously described technique. In addition, the unsynchronized content items are cryptographically encrypted using a key generated by the team administrator. With this technique, in addition to preserving the potentially only copy of the unsynchronized content items, access to the unsynchronized content items on the personal computing device is under control of the team administrator after the device is unlinked from the service.

In accordance with yet another technique of the present invention, the synchronized content items are removed or deleted from the personal computing device and the unsynchronized content items are not deleted or removed from the personal computing device as with a previously described technique. In addition, the unsynchronized content items are moved from their current location at the personal computing device to another location at the personal computing device. For example, the unsynchronized content items may be moved to a directory of the personal computing device's file system that is not involved with synchronizing content items with the synchronization service. With this technique, in addition to preserving the potentially only copy of the unsynchronized content items, the unsynchronized content items that remain after the device is unlinked are kept separate from content items stored in the area of the device's file system involved with synchronizing content items with the synchronization service. This can prevent user confusion or user frustration if the user's device is relinked to the synchronization service.

In some embodiments of the present invention, the encryption and moving techniques are combined in the same technique so that, in addition to preserving the potentially only copy of the unsynchronized content items, access to the unsynchronized content items on the personal computing device is under control of the team administrator after the device is unlinked from the service and the unsynchronized content items that remain after the device is unlinked are kept separate from content items stored in the area of the device's file system involved with synchronizing content items with the synchronization service.

While in some embodiments, unsynchronized content items are treated differently from synchronized content items when a personal computing device storing the unsynchronized and synchronized content items is unlinked from a synchronization service, the synchronized content items and unsynchronized content items are treated the same in other embodiments. For example, in some embodiments, all of the synchronized and unsynchronized content items at the personal computing device are deleted, encrypted, or encrypted and moved when the personal computing device is unlinked.

BRIEF DESCRIPTION OF THE DRAWINGS

In the drawings:

FIGS. 5-8 depict various user interfaces that may be presented to a user of a synchronization service, in accordance with some embodiments.

DETAILED DESCRIPTION

In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Content Items

As used in this description and the appended claim, a "content item" is a distinct logical collection of data. A content item can have one or more types that reflect the format or content of the data. A content item can also have a name and an identifier. When stored at a personal computing device, a content item can take the form of an operating system file system file. Non-limiting examples of content items that may be stored at a personal computing device include image files (e.g., .jpg, .tiff, .gif), music files (e.g., .mp3, .aiff, .m4a, .wav), movie files (e.g., .mov, .mp4, .m4v), MICROSOFT WORD documents (e.g., .doc, .docx), MICROSOFT POWERPOINT presentation files (e.g., .ppt, .pptx), MICROSOFT EXCEL spreadsheet files (e.g., .xls, .xlsx), ADOBE pdf files (e.g., .pdf), keynote presentation files (e.g., .key), pages document files (e.g., .pages), numbers spreadsheet files (e.g., .numbers), web page files (e.g., .htm, .html), and text and rich-text files (e.g., .txt, .rtf).

Network Environment

Figure 1:
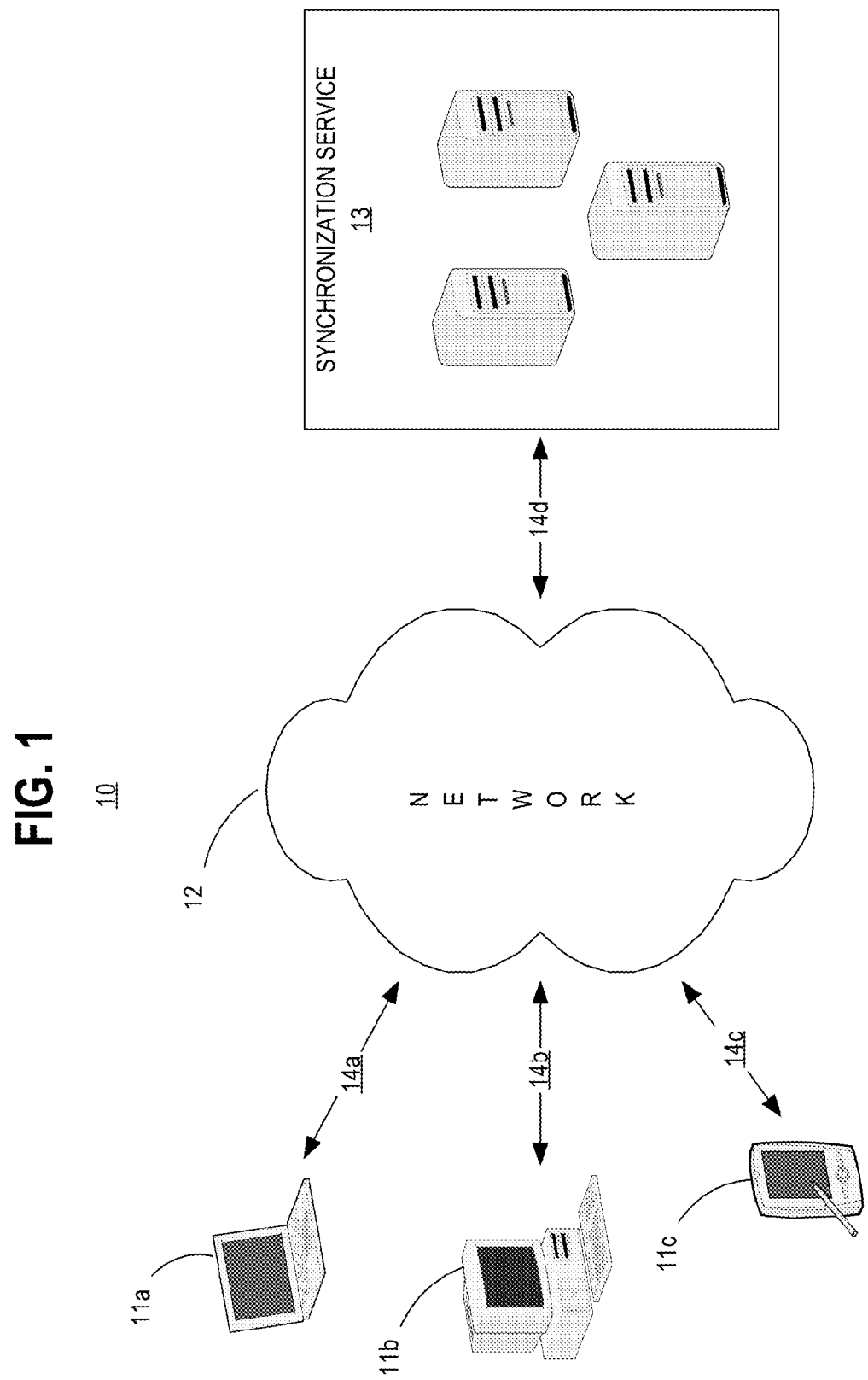
FIG. 1 illustrates an example networked computing environment in which the techniques of the present invention may be implemented, in accordance with some embodiments.

FIG. 1 illustrates an example networked computing environment 10 in which the techniques of the present invention may be implemented, in accordance with some embodiments. Environment 10 includes personal computing devices 11 used by users of synchronization service 13. Devices 11 and service 13 are connected to each other by network 12. Network 12 may be the Internet, for example. Network 12 is not limited to being any particular type of network and may be other than the Internet. For example, network 12 can be a local area network (LAN) or other network covering a limited geographic area such as those commonly found in business, offices, schools, and homes.

Devices 11 and service 13 are connected to network 12 by network communication channels 14. Channels 14 can be wired (e.g., twisted pair, coaxial cable, ITU-T G.hn, optical fiber, etc.) or wireless (e.g., microwave, satellite, radio-wave, infrared, etc.). Different computing devices 11 may use different types of channels 14 or the same type of channel 14 to connect to network 12. For example, device 11a may connect to network 12 over a wired Ethernet channel 14a while personal computing devices 11b and 11c may connect to network 12 over IEEE 801.11b-based radio channels 14b and 14c respectively. Similarly, devices 11 and service 13 may use different types of channels 14 or the same type of channel 14 to connect to network 12. In some embodiments where network 12 involves the Internet, service 13 is housed in one or more data center facilities or one or more computer hosting facilities providing relatively high-bandwidth channel 14d to network 12 and devices 11a through 11c connect to network 12 using relatively lower bandwidth channels 14a through 14c respectively.

Network communication between devices 11 and service 13 over network 12 can occur according to one or more of a variety of different network communication protocols (e.g., TCP/IP, UDP, HTTP, HTTPS). In some embodiments, devices 11 and service 13 encrypt some or all network communications when communicating with each other over network 12. For example, such communications may be encrypted using TSL, SSL, or other networking layer encryption scheme.

Devices 11 can be virtually any personal computing device capable of accessing network 12 and service 13. Devices 11 can be stationary (e.g., workstation, desktop, kiosk computers, server computers) or portable (e.g., laptop computers, mobile phones, smart phones, tablet computers). Devices 11 can be configured with an operating system (e.g., WINDOWS NT-based, WINDOWS MOBILE, FREEBSD, LINUX, MAX OS X, NETBSD, OPENBSD, DRAGON FLY BSD, ANDROID, IOS). Devices 11 may have one or more general purpose computing components such as those of computer system 900 described below with respect to FIG. 9.

While three devices 11 are shown in environment 10, more or less than three devices 11 may exist in environment 10 in other embodiments. Further, devices 11 can be used by different users and multiple devices 11 can be used by the same user.

Synchronization Agent

Figure 2:
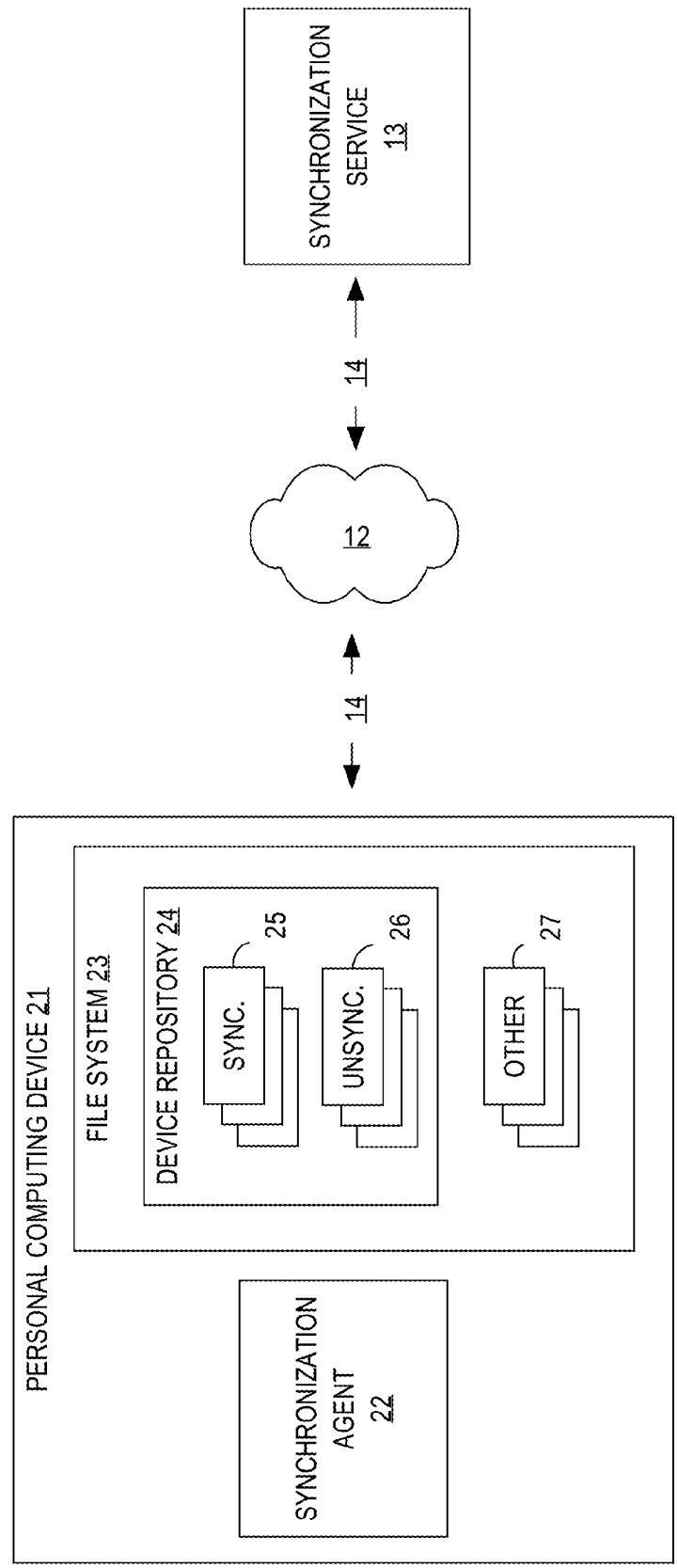
FIG. 2 illustrates components and configuration of a personal computing device capable of implementing the techniques of the present invention, in accordance with some embodiments.

FIG. 2 illustrates components and configuration of a personal computing device 21 capable of implementing the techniques of the present invention, in accordance with some embodiments. Device 21 may be one of devices 11a, 11b, or 11c in environment 10 of FIG. 1, for example. Device 21 may have more components than is shown in FIG. 2 and described below. For example, device 21 may have one or more general purpose computing components such as those of computer system 900 described below with respect to FIG. 9. Device 21 may also be configured with an operating system (not shown) and one or more applications (not shown) that are configured to execute thereon such as, for example, a word processing application, a web browsing application, an e-mail application, etc.

Device 21 includes a synchronization agent 22. Agent 22 may be a software program provided by an operator or owner of service 13. For example, a user of device 21 may download agent 22 from a web site of the operator or the owner and thereafter install agent 22 on device 21. While in some embodiments agent 22 is a software program, agent 22 is hard-wired logic or a combination of hard-wired logic and software in other embodiments. Further, while in some embodiments agent 22 is provided by an operator or owner of service 13, agent 22 is provided by others in other embodiments. For example, agent 22 may be an open-source software program capable of interfacing with service 13 and performing techniques described herein.

Device 21 also includes file system 23. File system 23 may be a conventional operating system file system composed of file and directories arranged in a file system hierarchy. More precisely, file system 23 is a file system interface to files and directories stored "at" device 21. For example, the file system interface may be provided by an operating system of device 21.

Reference is made herein to content items stored "at" a personal computing device. However, some of the files and directories accessible through the personal computing device's file system may not be stored on a storage device housed within the form factor of the personal computing device. For example, some of the files and directories of file system 23 may be stored on a network file server or an external storage device that is mounted in file system 23. In this description and the appended claims, any content item accessible through a file system interface of a personal computing device, whether stored on a storage device of the personal computing device or stored on a storage device external to the personal computing device, is considered to be stored "at" the personal computing device.

An area or areas 24 of the file system 23 may be involved in synchronizing a set of content items stored at device 21 with another set of content items stored at service 13. This area or these areas is designated generally in FIG. 2 as device repository 24 of file system 23. For example, device repository 24 may be a particular directory of file system 23 and all sub-directories and sub-files according to the file system hierarchy thereof. As another example, device repository 24 may be a set of multiple directories of file system 23 and all sub-directories and sub-files according to the file system hierarchy thereof. As yet another example, device repository 24 may be a set of one or more individually selected or designated files and/or directories of file system 23.

Device repository 24 represents a set of zero or more content items corresponding to a set of zero or more files within device repository 24 involved in synchronization with service 13. Synchronization between device 21 and service 13 may occur according to an asynchronous, eventually consistent, loosely consistent, or optimistic data replication scheme as opposed to a synchronous or strictly consistent data replication scheme. Thus, at any given time there may be unsynchronized content items 26 stored in device repository 24.

An unsynchronized content item 26 is a new content item or a new version of a content item stored in device repository 24 that service 13 has not yet stored a copy of. This could be because the new content item or the change resulting in the new version has not yet been communicated to service 13 or service 13 has not yet completed storing a copy of the new content item on its systems or not yet completed application of the change to the existing copy of the content item stored on its systems.

In contrast, a synchronized content item 25 is a content item stored in device repository 24 for which service 13 has a current copy of. Thus, at any given, there may be a mix of synchronized content items 25 and unsynchronized content items 26 in device repository 24.

File system 23 may also store other content items 27 outside device repository 24. For example, file system 23 may store content items not involved in synchronization with service 13.

Synchronization Service

Figure 3:
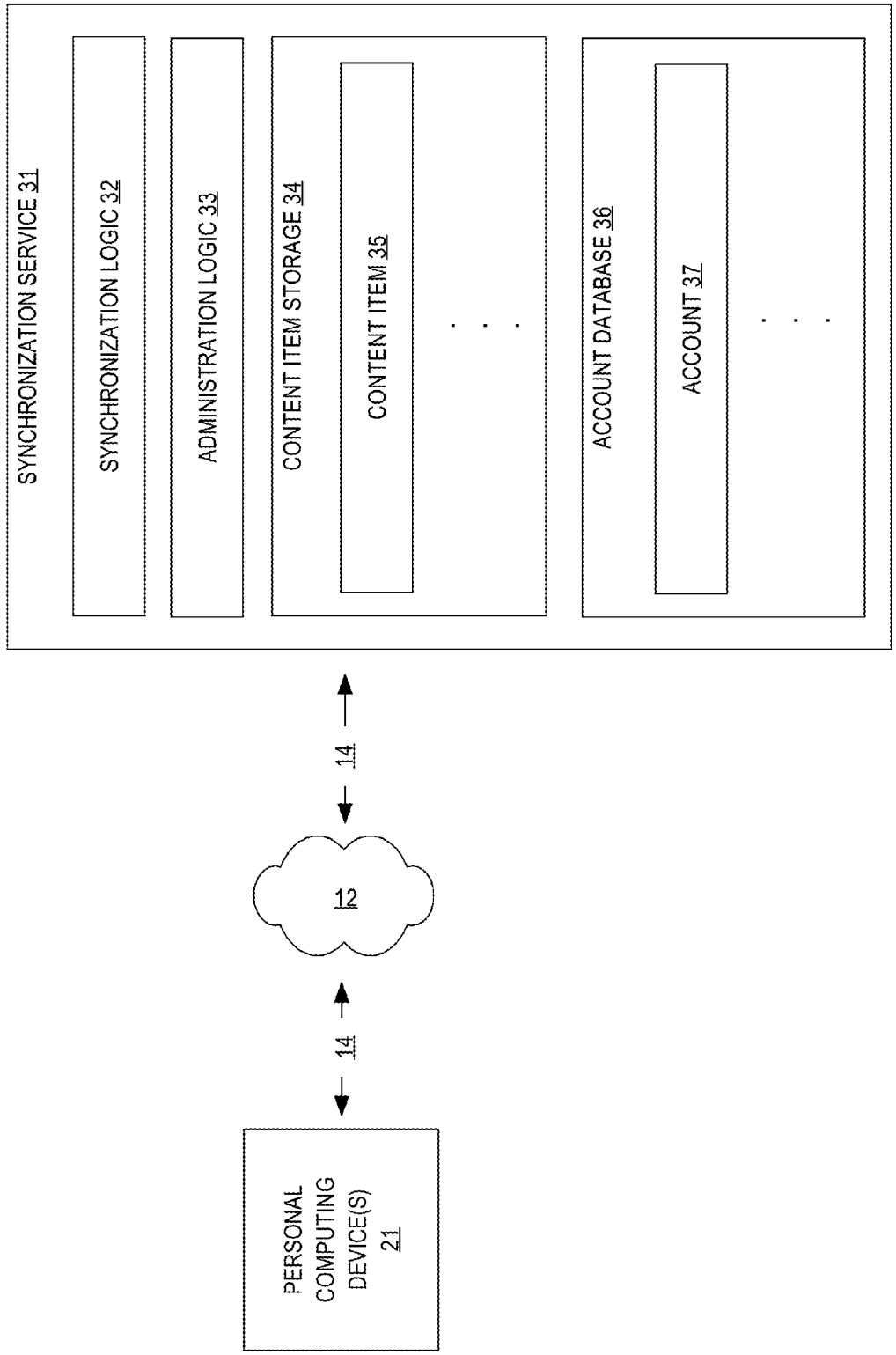
FIG. 3 illustrates components and configuration of a synchronization service capable of implementing the techniques of the present invention, in accordance with some embodiments.

FIG. 3 illustrates components and configuration of a synchronization service 31 capable of implementing the techniques of the present invention, in accordance with some embodiments. Synchronization service 31 may be synchronization service 13 in environment 10 of FIG. 1, for example. Synchronization service 31 may be implemented by one or more computer systems such as one or more of computer system 900 described below with respect to FIG. 9. In some embodiments, functionality of synchronization service 31 is implemented by a collection of cooperative software programs executing on one or more computing devices housed in one or more data center facilities.

Synchronization service 31 includes synchronization logic 32. Synchronization logic 32 communicates with synchronization agents 22 on devices 21 for purposes of periodically synchronizing content items stored in device repositories 24 of devices 21 with content items stored in service repositories of synchronization service 31. Here, "service repository" refers to a logical collection of zero or more content items 35 stored in content item storage 34 associated with an account 37 in account database 36 held by a user of synchronization service 31. Synchronization between a device repository 24 on a device 21 and a service repository of synchronization service 31 occurs in the context of an account 37. In particular, synchronization in the context of a particular account 37 occurs between a device repository 24 on a device 21 and the service repository associated with that particular account.

The same content item 35 may belong to more than one service repository. For example, a content item 35 may be shared among multiple accounts 37.

Unlike content items 25, 26, and 28 stored at device 21, content items 35 in content item storage 34 may not correspond to a file in an operating system file system. However, nothing prevents a content item 35 in content item storage 34 from corresponding to a file in an operating system file system.

In some embodiments, content item storage 34 is a distributed data storage system implemented using commodity computing hardware hosted in one or more data center facilities or one or more other computing hosting facilities having individually addressable fixed-sized chunks (e.g., 4 MB). Each content item 35 is stored in one or more of the chunks depending on the size of the content item 35. Thus, in these embodiments, a content item 35 corresponds to one or more chunks of the distributed data storage system.

While in some embodiments as indicated in FIG. 3, content item storage 34 is owned or operated by the same owner or operator of synchronization service 31, content item storage 34 is owned or operated by a different entity than the one that owns or operates synchronization service 31 in other embodiments. For example, in one non-limiting embodiment, content item storage 34 is provided by the AMAZON Simple Storage Service (S3) owned and operated by AMAZON.COM of Seattle, Wash. and the remaining components of synchronization service 31 including synchronization logic 32, administration logic 33, and account database 37 are provided by Dropbox, Inc. of San Francisco, Calif.

Users of devices 21 that synchronize content items with service 31 have accounts 37 with service 31. In some embodiments, there are two types of accounts 37: individual accounts and team accounts. A team account belongs to a group of accounts 37 referred to herein as a "team". For example, a team may correspond to a business or organization or a department or group within a business or organization or other group of users that collaborate on the same content items. A user of a team account is referred to herein as a "team member" of the team. An individual account is one that does not belong to a team.

One or more team accounts that belong to a team may have special privileges with respect to the rest of team accounts that belong to the team. A user of a team account with special privileges is referred to herein as a "team administrator" of the team. For example, the team administrator may be the manager, director, or team leader of the group of team members. The special privileges of a team administrator may include, among other privileges, the ability to invite users to the team and remove users from the team.

When a device repository 24 at a device 21 is first or initially synchronized with a service repository associated with an account 37 at service 31, the service 31 "links" the device 21 to the account 37. For example, linking a device 21 to an account 37 may involve synchronization logic 32 recording a record of the device 21 in association with the account 37 in account database 36. The record may indicate useful information about the device 21 such as, for example, a device name, a device network address, and a timestamp reflecting the last successful synchronization between the device 21 and service 31.

More than one device 21 may be linked with the same account 37. For example, a user may use a mobile device 21 and a desktop device 21 to synchronize content items with service 31.

In some embodiments, a team administrator can unlink any team member's device 21 from the team. As explained in greater detail below, in some embodiments, this causes synchronization service 31 to send a command to the agent 22 on the device 21 to delete all synchronized content items 25 from the device's 21 device repository 24. In some embodiments, as explained in greater detail below, unsynchronized content items 26 in device repository 24 are treated differently that synchronized content items 25. In particular, unsynchronized content items 26 are not deleted by the agent 22 like synchronized content items 25.

Administration logic 33 drives a user interface accessible to users from their devices 21 through which the users can manage their accounts 37 and in the case of team administrators, manage the accounts 37 of team members. For example, administration logic 33 may include a web server or web servers for serving web pages to devices 21 for display to users by web browser applications executing on the devices 21.

In some embodiments, administration logic 33 allows a user to unlink a device 21 linked to the user's account 37, allows a team administrator to unlink a device 21 linked to a team member's account 37, and allows a team administrator to deactivate a team account 37 of a team member (in which case all devices 21 linked to the deactivated team account 37 are unlinked). Exemplary user interfaces for performing these and other actions are shown in the drawings and described in greater detail below.

Process for Managing Unsynchronized Content Items

Figure 4:
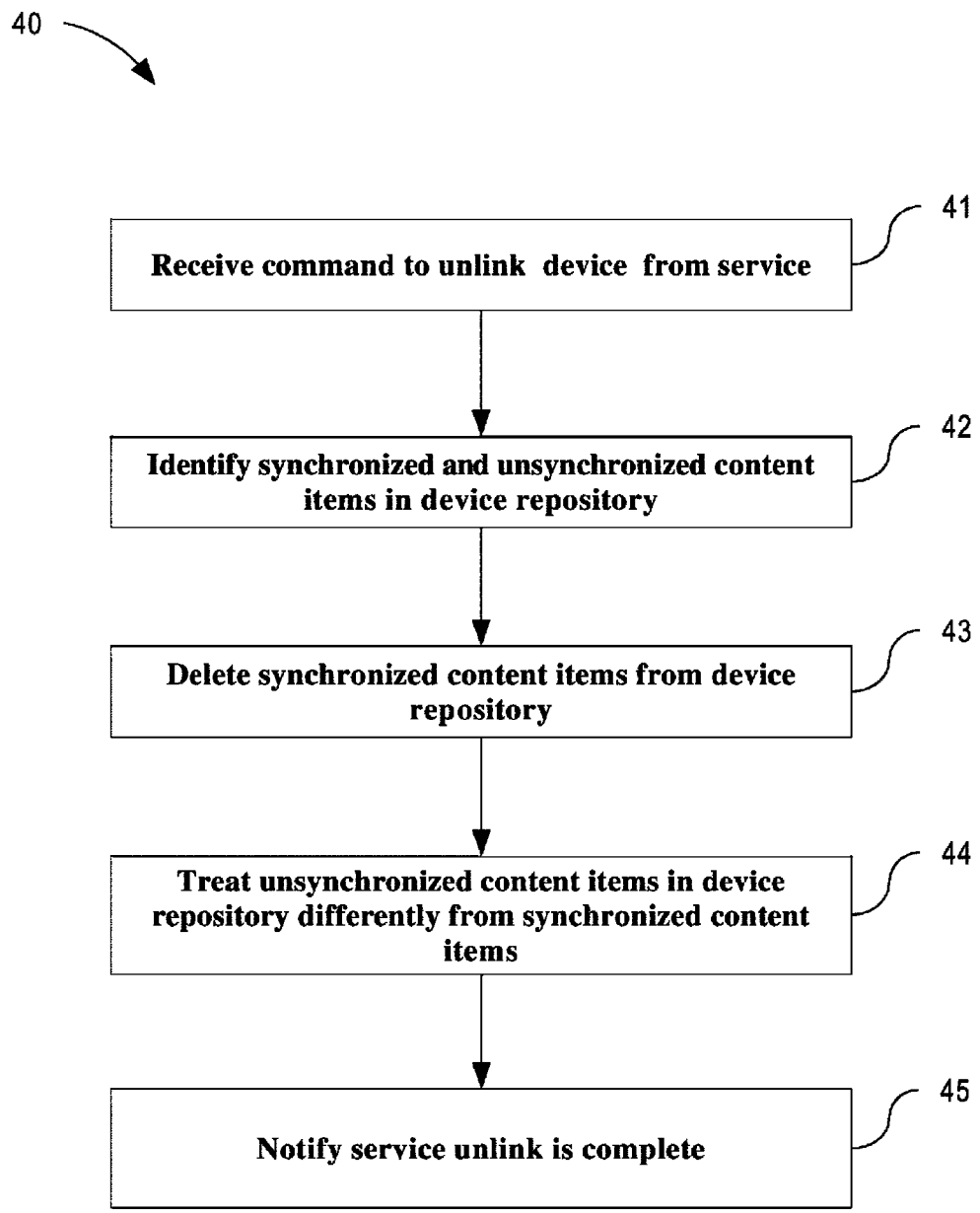
FIG. 4 is a flowchart illustrating steps of a process for managing unsynchronized content items at unlinked devices, in accordance with some embodiments.

FIG. 4 is a flowchart 40 illustrating steps of a process for managing unsynchronized content items at unlinked devices, in accordance with some embodiments. The process may be performed by a computing device such as, for example, device 21 of FIG. 2.

At step 41 of the process, the agent 22 on a device 21 linked to an account 37 held with synchronization service 31 receives a command from synchronization service 31 to unlink itself. For example, synchronization logic 32 of synchronization service 31 may send the command to the agent 22 after administration logic 33 of synchronization service 31 receives user input to unlink the device 21 from the account 37.

The account 37 may be an individual account or a team account. If an individual account, the user input to administration logic 33 may be provided by the holder of the account. If a team account, the user input administration logic 33 may be provided by the holder of the account or a team administrator of the team to which the team account belongs.

Agent 22 may receive the command to unlink in one or more network messages sent to it by synchronization logic 32. In some embodiments, the agent 22 establishes and maintains a long-lived TCP connection with synchronization logic 32 over which a notification protocol is conducted. The notification protocol can be used to notify the agent 22 of events occurring at synchronization service 31 such as changes to content items of the service repository associated with the account 37 and unlinking of the device 21 from the account 37.

In some embodiments, the notification protocol works as follows. The agent 22 sends a notification request over the TCP connection to synchronization logic 32. Upon receiving a notification request, the synchronization logic 32 waits for any interesting events to occur at synchronization service 31 pertinent to the device 21 or the account 37. If an interesting event occurs at synchronization service 31 such as, for example, the device 21 is unlinked from the account 37, synchronization logic 32 immediately advertises the event to the agent 22 over the TCP connection. Upon receiving the advertisement of the event, the agent 22 processes the event. Such processing may involve the agent 22 establishing other TCP connections to the synchronization logic 32 for purposes of exchanging information with synchronization logic 32 needed to process the event. For example, if unsynchronized content items 26 in the device repository 24 of the device 21 are to be encrypted, then the exchanged information may include an encryption key set by the team administrator. If the agent 22 hasn't received an advertisement from the synchronization logic 32 after a certain period of time since the last notification request (e.g., sixty seconds), the agent 22 may send another notification request. The agent 22 may also send a new notification request after processing an event advertisement. In this way, the agent 22 can be notified when the device 21 is unlinked from the account 37.

While in some embodiments the notification protocol is used to notify an agent on a device when the device is unlinked from an account, other protocols are used in other embodiments to accomplish the notification. For example, the agent 22 and synchronization logic 33 may implement a poll or push protocol to accomplish the notification.

At step 42 of the process, the agent 22 on the device 22 identifies which content items, if any, in device repository 24 are synchronized content items 25 and which content items, if any, in device repository 24 are unsynchronized content items 26. Such identification can made based on synchronization data available to the agent 22. For example, the synchronization data may indicate content items added to device repository 24 and content items modified in device repository 24 since the last successful synchronization with the service repository associated with the account 37. When a new content item is stored in device repository 24 or when an existing content item in device repository 24 is modified, the synchronization data at the device 21 is updated to indicate that the new or modified content item is unsynchronized. When unsynchronized content items 26 are synchronized with the service repository, the synchronization data is updated to indicate the formerly unsynchronized content items 26 are now synchronized content items 25. In this way, the synchronization data indicates at any given time the unsynchronized content items 26 in the device repository 24.

Identification of unsynchronized content items 26 and synchronized content items 25 in device repository 24 can be based on synchronization data received by the agent 22 from the synchronization service 31 in addition to or instead of synchronization data stored at the device 21. The synchronization data received from the synchronization service 31 may indicate the content items 35 in the service repository and the versions of the content items 35. For this, the synchronization data may include cryptographically generated checksums indicating the content items 35 in the service repository and the versions of the content items 35. The checksums received from the synchronization service 31 can be compared to checksums generated from the content items in the device repository 24 to determine which of the content items are unsynchronized content items 26 and which are synchronized content items 25.

At step 43 of the process, the synchronized content items 25 in the device repository 24 are deleted or removed from the file system 23. Preferably, the synchronized content items 25 are deleted or removed in such a way that they are not recoverable by a user of the device 21 through a recycle bin or similar feature provided by the operating system of the device 21.

At step 44 of the process, the unsynchronized content items 26 are treated differently than the synchronized content items 25. In particular, the unsynchronized content items 26 are not deleted or removed from the file system 23. In some embodiments, the unsynchronized content items 26 are left in place in the device repository 24. In some embodiments, the unsynchronized content items 26 are cryptographically encrypted in place using an encryption key received from the synchronization service 31 and a symmetric key algorithm (e.g., AES, Blowfish, RC4, 3DES, or the like). In some embodiments, the unsynchronized content items 26 are moved within file system 23 from their location within device repository 24 to a location outside of the device repository 24 within the file system 23. In some embodiments, the unsynchronized content items 26 are moved within file system 23 to a location outside of the device repository 24 and cryptographically encrypted.

At step 45 of the process, the agent 45 sends a network message to synchronization logic 32 that the handling of the unlink command received at step 41 is complete.

User Interfaces

Figure 5:
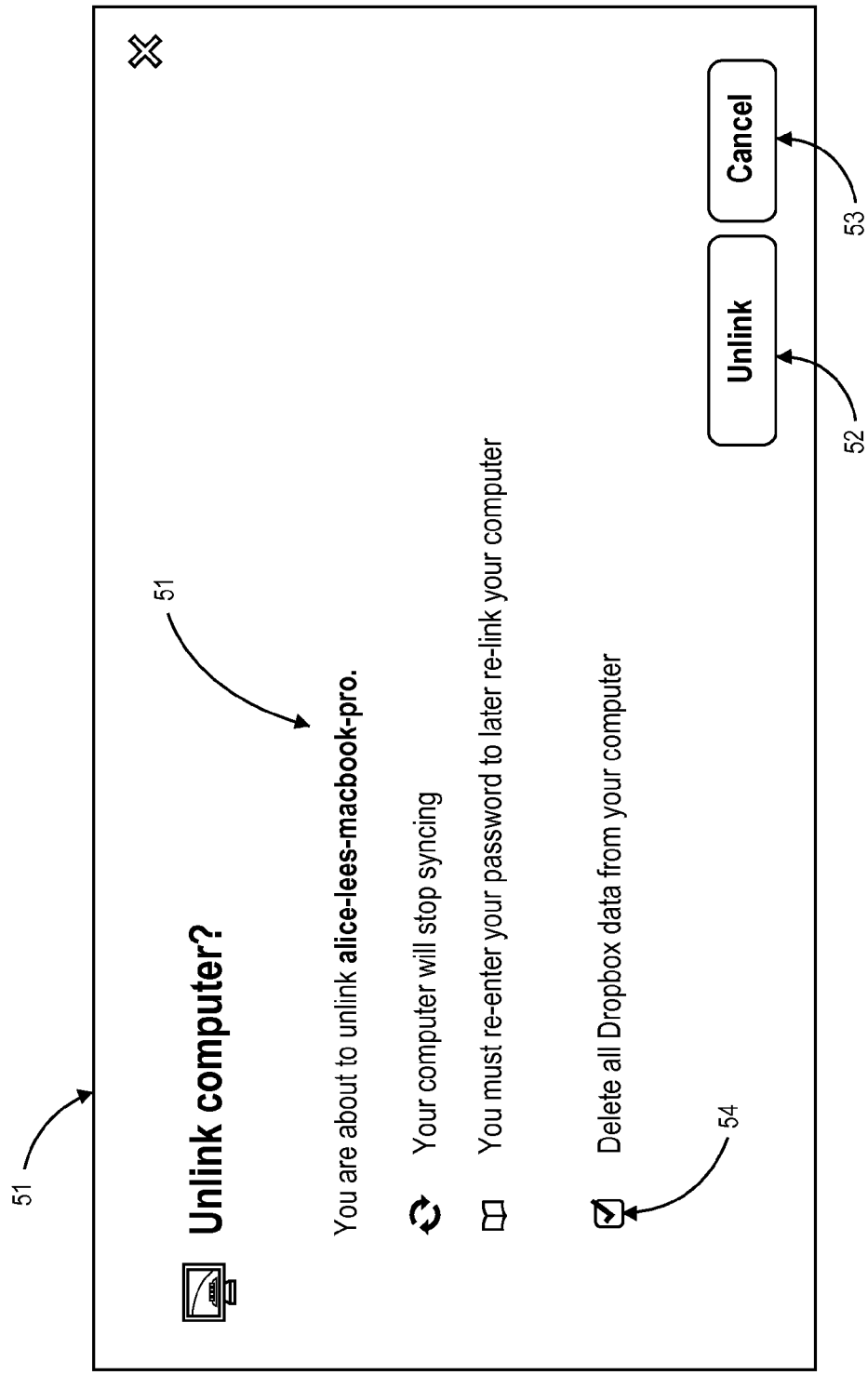

FIG. 5 depicts a user interface 51 that administration logic 33 may present to a user after the user selects one of her own devices 21 to unlink from her account 37. The user interface identifies 51 the device 21 to be unlinked by its name. The user interface 51 provides a unlink button 52 which can be activated by the user to actually initiate the unlink of the device 21. Alternatively, the user can activate the cancel button 53 if the unlink is no longer desired. The user interface 51 also provides a checkbox 54 which the user can select to cause the unlink to remove all synchronized content items 25 from the device's 21 repository 24 and to treat the unsynchronized content items 26 in the device repository 24 differently from the synchronized content items 25.

When a request to unlink a device 21 is made through administration logic 33, processing the unlink by the agent 22 on the device 21 may not be immediate. For example, the device 21 may currently be offline when the unlink is requested. Thus, it may be minutes or longer after the unlink is required before the synchronization service 31 receives notification from the agent 22 that unlink has been processed. FIG. 6 depicts a user interface 61 that administration logic 33 may present to a user after an unlink of a device 21 has been initiated but before synchronization service 31 has received notification that handling of the unlink command by the agent 22 on the device 21 is complete. As shown, an unlink of a device 21 named Android has been initiated. While processing of the unlink by the agent 22 on the device 21 is still pending which may take many minutes or longer, the device 21 is shown with a status 62 of "Delete in progress" in user interface 61.

FIG. 7 depicts a user interface 71 that administration logic 33 may present to a user after synchronization service 31 has received notification that handling of a unlink command by an agent 22 on a device 22 has successfully completed. As shown, an unlink of a device 21 named mbpr579 has successfully completed as indicated by status 72.

Figure 8:
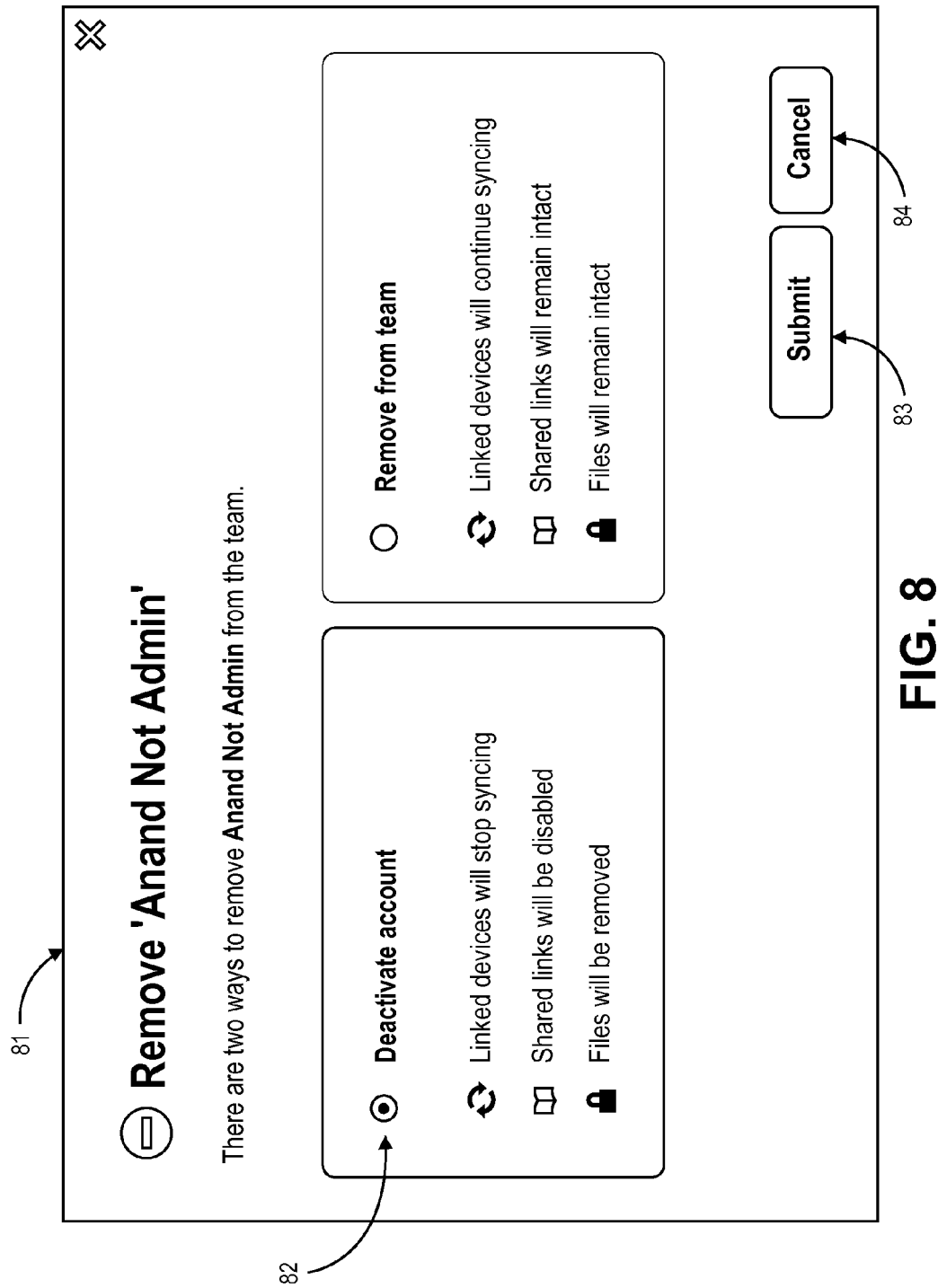

In some embodiments, in addition to being able to unlink individually selected team member devices 21 through a user interface provided by administration logic 33, a team administrator can also unlink all devices 21 linked to a team member's account 37 by removing the team member from a team and deactivating the account 37. For example, FIG. 8 depicts a user interface 81 that allows a team administrator to deactivate a team member's account 37 thereby unlinks all devices 21 linked to the team member's account 37. Here, the team administrator has selected to deactivate the team member's account 37 as opposed to merely removing the team member from the team by selecting radio button 82. The team administrator can initiate an unlink of each of the team member's devices 21 linked to the team member's account 37 by activating the submit button 83. Alternatively, if the team administrator decides not to deactivate the team member's account 37, the team administrator can activate the cancel button 84.

Implementing Mechanism

Figure 9:
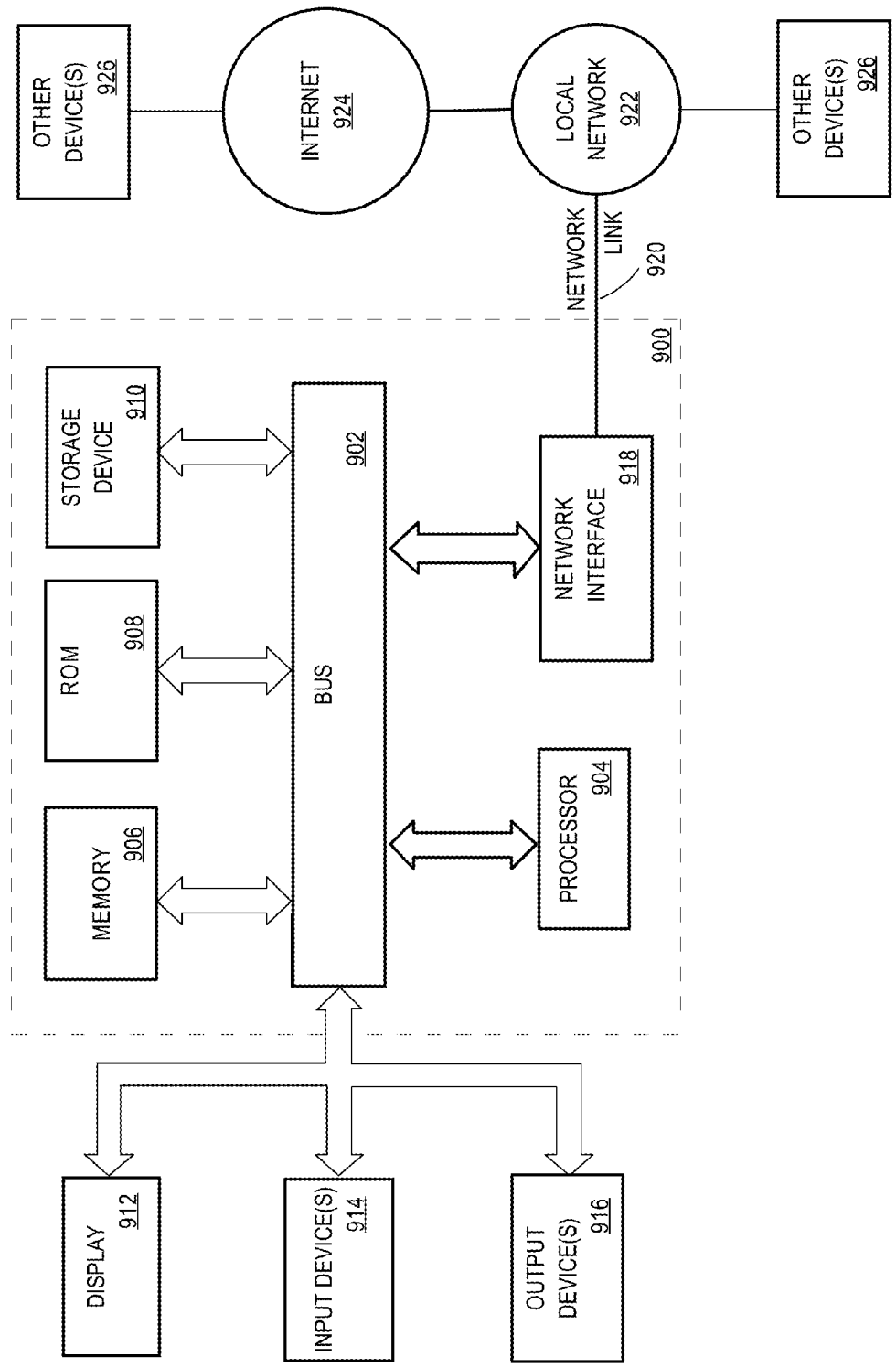
FIG. 9 is a block diagram illustrating a computer system with which the techniques of the present invention may be implemented, in accordance with some embodiments.

FIG. 9 is a block diagram that illustrates a computer system 900 with which the techniques of the present invention can be implemented, in accordance with some embodiments. Computer system 900 includes bus 902 or other communication mechanism for communicating information and hardware processor (CPU) 904 coupled with bus 902 for processing information. Bus 902 collectively represents all system, peripheral, and chipset buses that communicatively connect the numerous components of computer system 900. Hardware processor 904 may be one or more general purpose microprocessors, a multi-core processor, or a system on chip (SoC) in different implementations.

Computer system 900 also includes memory 906, such as a random access memory (RAM) or other dynamic storage device, coupled to bus 902 for storing information and instructions to be executed by processor 904. Memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904.

Storage device 910, such as a solid state drive, a magnetic disk, or an optical drive, is provided and coupled to bus 902 for storing information and instructions.

Computer system 900 can be coupled via bus 902 to display 912, such as a liquid crystal display (LCD), for displaying information to a computer user.

One or more physical input devices 914, for example an alphanumeric keyboard or other keyboard or keypad, can be coupled to bus 902 for communicating information and command selections to processor 904.

Another possible type of input device 914 is a cursor control, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Yet another possible type of input device 914 is a touch-sensitive surface, such as one that overlays display 912 to form a touch-screen display, for communicating direction and other information and command selections to processor 904. The touch-sensitive surface typically has a sensor or set of sensors that accepts input from a user based on haptic and/or tactile contact.

One or more output devices 916, for example headphones and/or audio speakers, can be coupled to bus 902 for outputting audible information to a computer user.

Network interface 918 provides a two-way data communication establishing a network link 920 to a local network 922. Network link 920 may be wired (e.g., an Ethernet wire link) or wireless (e.g., a cellular wireless link or WiFi wireless link). Local network 922 can be a local Area network (LAN), a wide area network (WAN), or other network that is communicatively coupled to the Internet 924 or one or more other data networks for communicating with one or more other computing devices 926 that are also linked to the Internet 924, local network 922, and/or the one or more other data networks.

Computer system 900 can send messages and receive data, including program code, through the network(s) 922 and/or 926, network link 920 and network interface 918. For example, a server 926 might transmit requested code for an application program through the Internet 924, local network 922 and network interface 918. The received code may be executed by processor 904 as it is received, and/or stored in storage device 910, or other non-volatile storage for later execution.

Computer system 900 may implement the techniques described herein using customized hard-wired logic, one or more application specific integrated circuits (ASICs) or filed programmable arrays (FPGAs), firmware and/or program logic which in combination with the computer system causes or programs computer system 900 to be a special-purpose machine.

According to one embodiment, the techniques herein are performed by computer system 900 in response to processor 904 executing one or more sequences of one or more instructions contained in main memory 906. Such instructions may be read into memory 906 from another storage medium, such as storage device 910. Execution of the sequences of instructions contained in memory 906 causes processor 904 to perform the process steps described herein.

In alternative embodiments, hard-wired circuitry may be used in place of or in combination with software instructions.

The term "non-transitory media" as used in this description and in the appended claims refers to any media that store data and/or instructions that cause a machine to operation in a specific fashion. Such non-transitory media may comprise non-volatile media and/or volatile media. Non-volatile media includes, for example, solid state devices, optical drives, and magnetic disks, such as storage device 910. Volatile media includes dynamic memory, such as memory 906. Common forms of non-transitory media include, for example, floppy disks, flexible disks, hard disks, solid state drives, magnetic tape, CD-ROMs, flash drives, or any other electronic, magnetic, or optical data storage media, and a RAM, a PROM, an EPROM, a FLASH-EPROM, a NVRAM, or any other memory chip or cartridge. Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application and any continuing applications thereof including any continuations, continuations-in-part, and divisionals thereof, in the specific form in which such claims issue, including any subsequent correction.

What is claimed is:

1. A system comprising:
    an agent for installation on personal computing devices;
    a synchronization service executing on one or more server computing devices;
    a first set of content items stored in a device repository at a personal computing device; and
    a second set of content items stored at the personal computing device separate from the device repository;
    wherein the synchronization service is configured to send a command to the agent as installed on the personal computing device;
    wherein the agent as installed on the personal computing device is configured to, in response to receiving the command from the synchronization service:
        identify, from among the first set of content items stored in the device repository at the personal computing device, which of the first set of content items are synchronized with the synchronization service and which of the first set of content items are pending synchronization with the synchronization service, and
        treat any content items of the first set of content items identified as synchronized with the synchronization service differently from any content items of the first set of content items identified as pending synchronization with the synchronization service without modifying the second set of content items; wherein the treating differently includes moving any content items of the first set of content items identified as pending synchronization with the synchronization service from their current locations at the personal computing device to other locations at the personal computing device;
    wherein the synchronization service is configured to send synchronization data to the agent as installed on the personal computing device;
    wherein the synchronization data includes a first set of cryptographically generated checksums that indicates: a third set of content items stored at the synchronization service, and versions of the third set of content items stored at the synchronization service;
    wherein the agent is configured to generate a second set of cryptographically generated checksums based on the first set of content items;
    wherein the agent is configured to identify, from among the first set of content items stored at the personal computing device, which of the first set of content items are synchronized with the synchronization service and which of the first set of content items are pending synchronization with the synchronization service by comparing the first set of cryptographically generated checksums with the second set of cryptographically generated checksums.

2. The system of claim 1, wherein the treating differently includes cryptographically encrypting any content items of the first set of content items identified as pending synchronization with the synchronization service.

3. The system of claim 1, wherein the current locations are in the device repository at the personal computing device and wherein the other locations are outside the device repository at the personal computing device.

4. The system of claim 1, wherein the agent is further configured to receive from the synchronization service an encryption key for cryptographically encrypting any content items of the first set of content items identified as pending synchronization with the synchronization service.

5. The system of claim 1, wherein the personal computing device is linked to a user account in a database of the synchronization service.

6. The system of claim 5, wherein the user account is a team account held by a member of a team; and wherein the synchronization service is configured to provide a user interface allowing a team administrator of the team to unlink the personal computing device from the team account.

7. The system of claim 6, wherein the synchronization service is configured to send the command to the agent in response to receiving, through the user interface, a request from the team administrator to unlink the personal computing device from the team account.

8. The system of claim 1, wherein the agent is configured to identify, from among the first set of content items stored at the personal computing device, which of the first set of content items are synchronized with the synchronization service and which of the first set of content items are pending synchronization with the synchronization service using synchronization data stored at the personal computing device.

9. The system of claim 8, wherein the synchronization data stored at the personal computing device comprises synchronization data which indicates one or more content items of the first set of content items that were newly stored at the personal computing device since a last successful synchronization between the personal computing device and the synchronization service.

10. The system of claim 8, wherein the synchronization data stored at the personal computing device comprises synchronization data which indicates one or more content items of the first set of content items that were modified since a last successful synchronization between the personal computing device and the synchronization service.

11. A method comprising:
receiving, at an agent as installed on a personal computing device, a command from a synchronization service executing on one or more server computing devices;
in response to receiving the command from the synchronization service, the agent:
identifying, from among a first set of content items stored in a device repository at the personal computing device, which of the first set of content items are synchronized with the synchronization service and which of the first set of content items are pending synchronization with the synchronization service, and
treating any content items of the first set of content items identified as synchronized with the synchronization service differently from any content items of the first set of content items identified as pending synchronization with the synchronization service without modifying a second set of content items stored at the personal computing device separate from the device repository; wherein the treating differently includes the agent moving any content items of the first set of content items identified as pending synchronization with the synchronization service from their current locations at the personal computing device to other locations at the personal computing device;
receiving, at an agent as installed on the personal computing device, synchronization data from the synchronization service;
wherein the synchronization data includes a first set of cryptographically generated checksums that indicates: a third set of content items stored at the synchronization service, and versions of the third set of content items stored at the synchronization service;
the agent generating a second set of cryptographically generated checksums based on the first set of content items;
wherein the agent identifies from among the first set of content items stored at the personal computing device, which of the first set of content items are synchronized with the synchronization service and which of the first set of content items are pending synchronization with the synchronization service by comparing the first set of cryptographically generated checksums with the second set of cryptographically generated checksums.

12. The method of claim 11, wherein the treating differently includes the agent cryptographically encrypting any content items of the first set of content items identified as pending synchronization with the synchronization service.

13. The method of claim 11, wherein the current locations are in the device repository at the personal computing device and wherein the other locations are outside the device repository at the personal computing device.

14. The method of claim 11, further comprising the agent receiving from the synchronization service an encryption key for cryptographically encrypting any content items of the first set of content items identified as pending synchronization with the synchronization service.

15. The method of claim 11, wherein the personal computing device is linked to a user account in a database of the synchronization service.

16. The method of claim 15, wherein the user account is a team account held by a member of a team; and wherein the method further comprises the synchronization service providing a user interface that allows a team administrator of the team to unlink the personal computing device from the team account.

17. The method of claim 16, further comprising the synchronization service sending the command to the agent in response to receiving, through the user interface, a request from the team administrator to unlink the personal computing device from the team account.

18. The method of claim 11, further comprising the agent identifying, from among the first set of content items stored at the personal computing device, which of the first set of content items are synchronized with the synchronization service and which of the first set of content items are pending synchronization with the synchronization service using synchronization data stored at the personal computing device.

19. The method of claim 18, wherein the synchronization data stored at the personal computing device comprises synchronization data which indicates one or more content items of the first set of content items that were newly stored at the personal computing device since a last successful synchronization between the personal computing device and the synchronization service.

20. The method of claim 18, wherein the synchronization data stored at the personal computing device comprises synchronization data which indicates one or more content items of the first set of content items that were modified since a last successful synchronization between the personal computing device and the synchronization service.

21. The system of claim 1, wherein the treating differently includes deleting, from the personal computing device, any content items of the first set of content items identified as synchronized with the synchronization service and not deleting, from the personal computing device, any content items of the first set of content items identified as pending synchronization with the synchronization service.

22. The method of claim 11, wherein the treating differently includes deleting, from the personal computing device, any content items of the first set of content items identified as synchronized with the synchronization service and not deleting, from the personal computing device, any content items of the first set of content items identified as pending synchronization with the synchronization service.

* * * * *